(12) United States Patent
Schelvis et al.

(10) Patent No.: US 7,565,612 B2
(45) Date of Patent: Jul. 21, 2009

(54) METHOD AND SYSTEM FOR TRANSMITTING INFORMATION OVER A COMMUNICATION NETWORK

(75) Inventors: Wilhelmus Adrianus Maria Schelvis, Leiden (NL); Bastiaan De Jong, Amsterdam (NL)

(73) Assignee: Koninklijke KPN N.V., The Hague (NL)

( * ) Notice: Subject to any disclaimer, the term of this patent is extended or adjusted under 35 U.S.C. 154(b) by 555 days.

(21) Appl. No.: 10/354,445

(22) Filed: Jan. 30, 2003

(65) Prior Publication Data

US 2003/0146930 A1 Aug. 7, 2003

(30) Foreign Application Priority Data

Feb. 4, 2002 (EP) ................................. 02075487

(51) Int. Cl.
*G06F 3/00* (2006.01)
*G06F 3/048* (2006.01)

(52) U.S. Cl. ..................... 715/745; 715/738; 715/746; 715/864

(58) Field of Classification Search ................ 715/738, 715/745, 746, 864
See application file for complete search history.

(56) References Cited

U.S. PATENT DOCUMENTS

| | | | | | |
|---|---|---|---|---|---|
| 5,727,159 | A | * | 3/1998 | Kikinis | 709/246 |
| 5,798,759 | A | * | 8/1998 | Dahl | 715/745 |
| 6,020,883 | A | * | 2/2000 | Herz et al. | 715/721 |
| 6,044,376 | A | * | 3/2000 | Kurtzman, II | 707/102 |
| 6,085,229 | A | * | 7/2000 | Newman et al. | 709/203 |
| 6,112,192 | A | * | 8/2000 | Capek | 705/59 |
| 6,128,655 | A | | 10/2000 | Fields et al. | 709/219 |
| 6,138,142 | A | * | 10/2000 | Linsk | 709/203 |
| 6,167,441 | A | * | 12/2000 | Himmel | 709/217 |
| 6,173,316 | B1 | * | 1/2001 | De Boor et al. | 709/218 |
| 6,256,633 | B1 | * | 7/2001 | Dharap | 707/10 |
| 6,286,043 | B1 | * | 9/2001 | Cuomo et al. | 709/223 |
| 6,300,947 | B1 | * | 10/2001 | Kanevsky | 715/866 |
| 6,311,194 | B1 | * | 10/2001 | Sheth et al. | 715/505 |
| 6,327,628 | B1 | * | 12/2001 | Anuff et al. | 719/311 |

(Continued)

FOREIGN PATENT DOCUMENTS

DE 199 41 461 3/2001

(Continued)

OTHER PUBLICATIONS (Communication and European Search Report also submitted).

(Continued)

*Primary Examiner*—Steven B Theriault
(74) *Attorney, Agent, or Firm*—Michaelson & Associates; Peter L. Michaelson

(57) ABSTRACT

A method and system for transmitting information over a communication network comprising a user device and a server, wherein the user device receives the information from or via this server. The method comprises the step of triggering an interactive session between the server and the user device depending on at least one property of the requested information and evaluating the result of the interactive session. On the basis of the result of the interactive session, it is determined whether and/or in what form the requested information is transmitted to the user device.

42 Claims, 8 Drawing Sheets

U.S. PATENT DOCUMENTS

Figure 1:
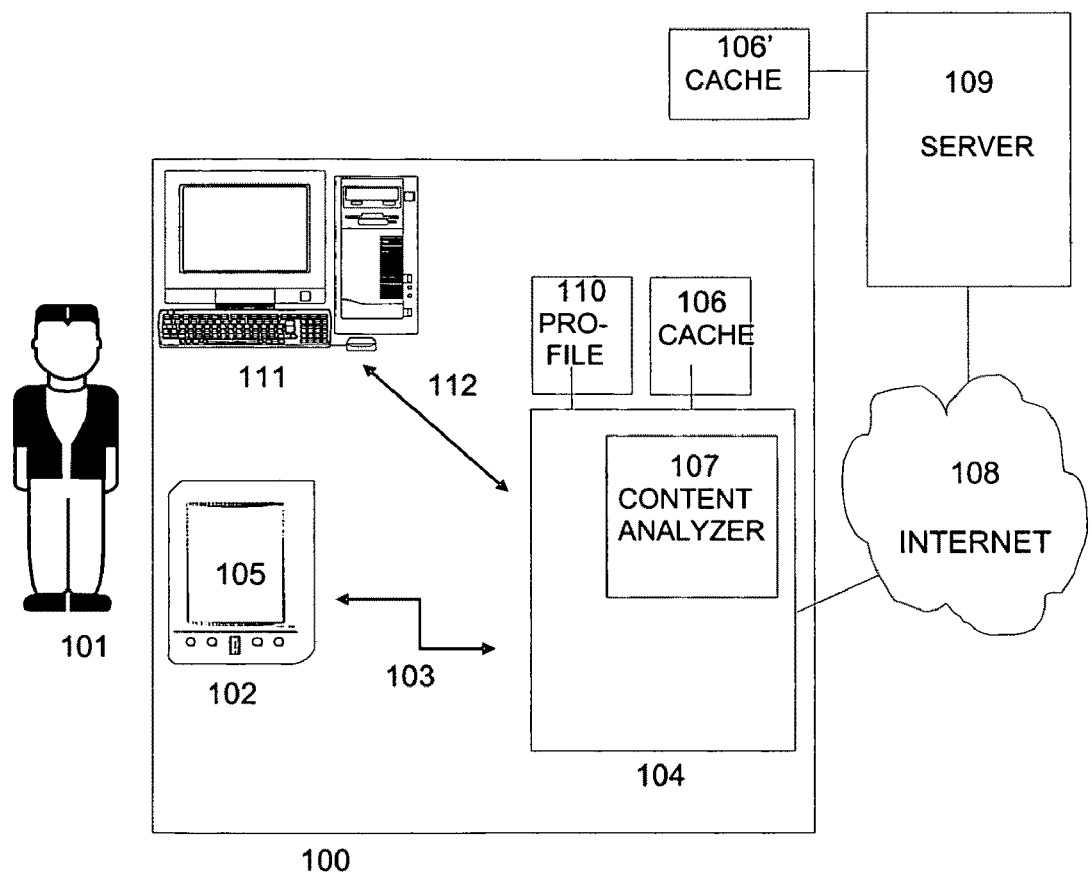

| | | | |
|---|---|---|---|
| 6,345,279 B1* | 2/2002 | Li et al. | 707/104.1 |
| 6,401,094 B1* | 6/2002 | Stemp et al. | 707/10 |
| 6,424,981 B1* | 7/2002 | Isaac et al. | 715/513 |
| 6,556,217 B1* | 4/2003 | Makipaa et al. | 345/667 |
| 6,564,251 B2* | 5/2003 | Katariya et al. | 709/214 |
| 6,589,291 B1* | 7/2003 | Boag et al. | 715/513 |
| 6,593,944 B1* | 7/2003 | Nicolas et al. | 715/744 |
| 6,615,247 B1* | 9/2003 | Murphy | 709/217 |
| 6,628,300 B2* | 9/2003 | Amini et al. | 345/660 |
| 6,654,689 B1* | 11/2003 | Kelly et al. | 702/3 |
| 6,684,217 B1* | 1/2004 | Schneider | 707/102 |
| 6,685,171 B2* | 2/2004 | Lob et al. | 254/391 |
| 6,690,402 B1* | 2/2004 | Waller et al. | 715/850 |
| 6,704,024 B2* | 3/2004 | Robotham et al. | 345/581 |
| 6,734,886 B1* | 5/2004 | Hagan et al. | 715/853 |
| 6,748,569 B1* | 6/2004 | Brooke et al. | 715/523 |
| 6,760,046 B2* | 7/2004 | I'Anson et al. | 715/746 |
| 6,766,362 B1* | 7/2004 | Miyasaka et al. | 709/219 |
| 6,791,581 B2* | 9/2004 | Novak et al. | 715/744 |
| 6,801,224 B1* | 10/2004 | Lewallen | 715/746 |
| 6,816,895 B2* | 11/2004 | Andreakis et al. | 709/219 |
| 6,822,663 B2* | 11/2004 | Wang et al. | 715/854 |
| 6,842,777 B1* | 1/2005 | Tuli | 709/217 |
| 6,857,102 B1* | 2/2005 | Bickmore et al. | 715/501.1 |
| 6,865,171 B1* | 3/2005 | Nilsson | 370/338 |
| 6,901,437 B1* | 5/2005 | Li | 709/219 |
| 6,961,758 B2* | 11/2005 | Krishnan | 709/217 |
| 6,963,908 B1* | 11/2005 | Lynch et al. | 709/220 |
| 6,976,226 B1* | 12/2005 | Strong et al. | 715/788 |
| 6,981,062 B2* | 12/2005 | Suryanarayana | 709/248 |
| 6,983,331 B1* | 1/2006 | Mitchell et al. | 709/246 |
| 7,010,581 B2* | 3/2006 | Brown et al. | 709/218 |
| 2001/0010061 A1* | 7/2001 | Matsumoto | 709/249 |
| 2001/0010685 A1* | 8/2001 | Aho | 370/329 |
| 2001/0013088 A1* | 8/2001 | Matsumoto | 711/135 |
| 2001/0056497 A1* | 12/2001 | Cai et al. | 709/230 |
| 2002/0002705 A1* | 1/2002 | Byrnes et al. | 725/14 |
| 2002/0010740 A1* | 1/2002 | Kikuchi et al. | 709/203 |
| 2002/0046295 A1* | 4/2002 | Asai | 709/246 |
| 2002/0059367 A1* | 5/2002 | Romero et al. | 709/203 |
| 2002/0062325 A1* | 5/2002 | Berger et al. | 707/518 |
| 2002/0069263 A1* | 6/2002 | Sears et al. | 709/218 |
| 2002/0073235 A1* | 6/2002 | Chen et al. | 709/246 |
| 2002/0083157 A1* | 6/2002 | Sekiguchi et al. | 709/219 |
| 2002/0099829 A1* | 7/2002 | Richards et al. | 709/227 |
| 2002/0133627 A1* | 9/2002 | Maes et al. | 709/246 |
| 2002/0138331 A1* | 9/2002 | Hosea et al. | 705/10 |
| 2002/0138545 A1* | 9/2002 | Andreakis et al. | 709/200 |
| 2002/0142815 A1* | 10/2002 | Candelore | 463/1 |
| 2002/0194388 A1* | 12/2002 | Boloker et al. | 709/310 |
| 2003/0009567 A1* | 1/2003 | Farouk | 709/229 |
| 2003/0028643 A1* | 2/2003 | Jabri | 709/226 |
| 2003/0041100 A1* | 2/2003 | Nilsson et al. | 709/203 |
| 2003/0050062 A1* | 3/2003 | Chen et al. | 455/435 |
| 2003/0110234 A1* | 6/2003 | Egli et al. | |
| 2003/0186722 A1* | 10/2003 | Weiner | 455/558 |
| 2003/0200337 A1* | 10/2003 | Jabri et al. | 709/246 |
| 2004/0004641 A1* | 1/2004 | Gargi | 345/848 |
| 2004/0098669 A1* | 5/2004 | Sauvage et al. | 715/513 |
| 2004/0122949 A1* | 6/2004 | Zmudzinski et al. | 709/225 |
| 2004/0267900 A1* | 12/2004 | Hoekstra et al. | 709/217 |
| 2005/0204276 A1* | 9/2005 | Hosea et al. | 715/501.1 |

FOREIGN PATENT DOCUMENTS

EP   1 307 021   5/2004

OTHER PUBLICATIONS

T. Shimada et al, "Interactive scaling control mechanism for World-Wide Web system", Computer Networks and ISDN Systems, North Holland Publishing, Amsterdam, NL, vol. 29, No. 8-13, Sep. 1, 1997, pp. 1467-1477.

* cited by examiner

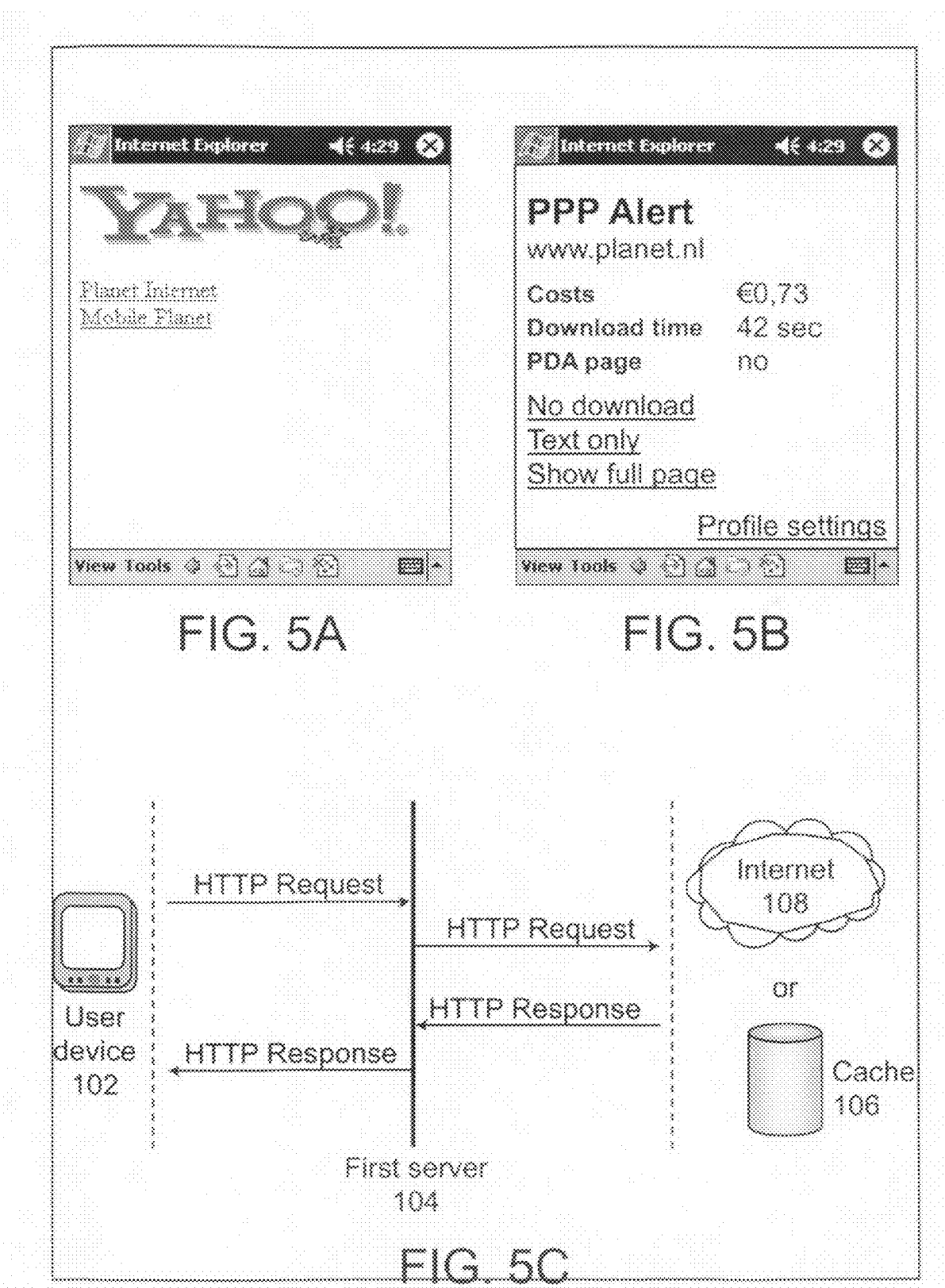

METHOD AND SYSTEM FOR TRANSMITTING INFORMATION OVER A COMMUNICATION NETWORK

A. BACKGROUND

1. Field of the Invention

The invention relates to a method and system for transmitting information over a communication network. More specifically, the invention relates to a method and system for transmitting information over a communication network comprising a user device and a server wherein the user device receives the information from or via this server.

2. Background

In recent years the creation, manipulation and distribution of information has become a major economic activity. Technological developments and business developments in this area have shown significant progress. Technological developments include the various kinds of developments relating to the internet and the recent efforts to realize state-of-the art services using wireless networks, like GSM, GPRS and UMTS. Parallel to these technological developments people cudgel their brains about how to apply the enormous technological possibilities in a commercially interesting way. Many business models have been discussed (see http://digitalenterprise.org/models/models.html), but only few of them have 'proved' to be relatively successful.

General Packet Radio Services (GPRS) is a packet-based wireless communication service that promises data rates from 56 up to 114 Kbps and continuous connection to the Internet for mobile phone and computer users. The introduction of GPRS has resulted in a new business model for providing internet access. The user pays for the data volume (i.e., the number of bytes) transmitted over the network, instead of per unit of time of connection to the network or a flat fee rate. For the average user, the concept of data volume is hard to comprehend and moreover a user normally is not aware of the data volume of a particular information page. Within the GPRS business model as described above, this information is crucial, since the data volume determines the costs of the GPRS-usage.

Another problem arises since not all user devices are suited to retrieve a particular information page from the internet or these pages cannot be satisfactorily displayed on the user device. It might be that a user device, such as a Personal Digital Assistant (PDA), suited to retrieve certain information pages wirelessly from the internet is trying to retrieve information from a information page which is not suited for PDA-access. The user will experience that it takes a considerable amount of time before the information page is retrieved by the PDA, and moreover that the page cannot or is incorrectly displayed on the PDA. However, since the user has retrieved the page, he has to pay for the data retrieved by the PDA in the usage-based business model. It will be appreciated that this user will be dissatisfied.

B. SUMMARY

It is an aim of the invention to improve the transmission of information over a communication network by taking account of at least one property of the information. A communication network is every wired and/or wireless network, comprising at least a user device and a server, which is capable of transmitting or carrying information. It will be appreciated that information comprises data as well. Information is stimuli that has meaning in some context for its receiver; data is information that has been converted into a form that is more convenient to move or process.

In an embodiment of the invention, a method and system are provided for transmitting information over a communication network comprising at least a first server and a user device. The method comprises the steps of receiving a request from the user device at the first server and setting up an interactive session between the first server and the user device wherein it is determined if the requested information should actually be transmitted to the user device. Application of this method can provide the user and/or the user device with the option to avoid actual transmission of information that he initially requested. It is noted that the request of the user might be directed to a second server on which the requested information is present, but this request can be redirected to the first server for applying the method without the user noticing this redirection. It is advantageous to evaluate the result of the interactive session using at least one property of the information as to whether the requested information should be transmitted or alternatively the requested information sent in a modified form. It is noted that the moment of the request of the information and set up of the interactive session do not necessarily nearly coincide; it can be that a profile with favorite information pages of the user is already present at or retrievable by the server, e.g., as a result of an earlier request and a preset time of transmitting this information is known by the server as well. In that case, only near the moment of actual transmission of this information an interactive session with the user and/or the user device is set up in order to provide the user and/or user device with the possibility to avoid transmission of this information to the user device or alternatively have the option to receive the information in a modified form.

In a variant of the invention, the requested information is retrieved from a second server wherein the first server can evaluate the at least one property of the requested information. It can be that the information from this second server already has a property tag, identifying the at least one property of the information, in which case the evaluation of the information retrieved from the second server can be omitted at the first server. The information and/or the information property can be stored at the first server. By having the possibility to retrieve information from other servers and being able to identify or assign a property of the retrieved information, the amount of information wherein the method can be applied is greatly enhanced.

In an embodiment of the invention, a profile database is provided with data relating to user profile and/or user device profile data. By comparing the data of this profile database for a certain user and/or user device with at least one property of the requested information the set up of the interactive session can be triggered. In this interactive session, a query is provided to the user and/or the device wherein the information property or a related message or question is 'made known' (e.g., via a short message) to the user and/or his device providing the option to respond whether and in what form the information can be transmitted to him. In a variant of this embodiment, the profile relates to the byte size of the requested information and/or the display measurements of the information. In this way, it can be ensured that if the byte size of a requested information page is, e.g., larger than the byte size set in the profile database for the byte size of information pages, the user and/or user device is provided in the interactive session with, e.g., the possibility to avoid the actual transmission of the information thereby reducing his costs. The same holds for other data in the profile database, such as, e.g., the measurement of the display of the user device and the information property regarding the measurements of the display of the requested information.

Similarly, the profile can relate to formats supported by the device such as specific HTML-versions, ActiveX, Java Applets, Flash, etc.

In a preferred embodiment, the user is provided with the possibility to set the user profile and device profile data himself, either by the user device or by any other device having access to the profile database. This profile database is not necessarily accessed over the same network as the communication network. It can, e.g., be possible that the user receives his information on his handheld device connectable to a GPRS network, while the user sets his profile via his home personal computer using a fixed network. The user is provided with great flexibility through this option. By setting his profile, the user can determine when an interactive session is triggered. The user can, e.g., set a limited byte size, resulting in frequent triggering of the interactive session providing the user and/or his device with a query whether and in what form the information should be transmitted to his device. On the other hand, the user can set a high limit on the byte size resulting in less frequent triggering of the interactive session and more often the information is just transmitted to the user without a query. The user can modify the settings in the profile database at any time. It is noted that various other information property data and user and/or device profile data can be applied. Examples of other types of data include the time on which the information is requested (lower costs at off-peak hours) or the data volume the user has already used. It is also possible to obtain variation in the applicability of certain profile data on the basis of, e.g., identification of the information (content) provider.

As already referred to above, in a variant of the invention the method and system comprise the possibility to modify the requested information in a (more) suitable form before the information is sent to the user device. The user and/or his device can approve the modification of the requested information since a further query is sent to the user device in the interactive session providing the user and/or his device with the option to receive the modified information. Alternatively, it is possible that the first server notices that the information property does not satisfy the data of the user profile and immediately (i.e., in the first query) provides the user and/or device with a query offering the possibility to receive the requested information in a modified form.

It is noted that the query or queries presented to the user in the interactive session do not necessarily involve queries on which a positive or negative answer can be given, but also queries involving questions with more options than "yes" or "no" are possible. Such an option can be that the user is offered the (additional) possibility to be redirected to an information page with the same content which is (more) suitable for his device. This possibility can be offered in the same query as well as in a subsequent query.

Moreover, it is noted that the information requested can comprise more information parts. An information page which is requested by the user might comprise text, images, movies, sounds and/or applets. It can be that for one or more of these information parts individual properties of the information are known at the first server and the triggering of the interactive session and/or the result of the interactive session relates to one or more properties of one or more of the information parts. These properties of the various information parts can involve the byte size, download costs, display size and/or technical ability requirements for the user device. It can, e.g., be that a upper byte size limit set by the user allows transmittal of information pages including text and images, but not movies. To enable this feature of the method according to a preferred embodiment of the invention, the information properties of different information parts are stored at or retrievable by the first server.

If the user and/or the device does not want to receive the requested information nor to receive the modified data, the result of the interactive process can be non-transmittal of the information.

It is noted that the previous embodiments or aspects of the previous embodiments of the invention can be combined.

C. SHORT DESCRIPTION OF THE DRAWINGS

Figure 2A:
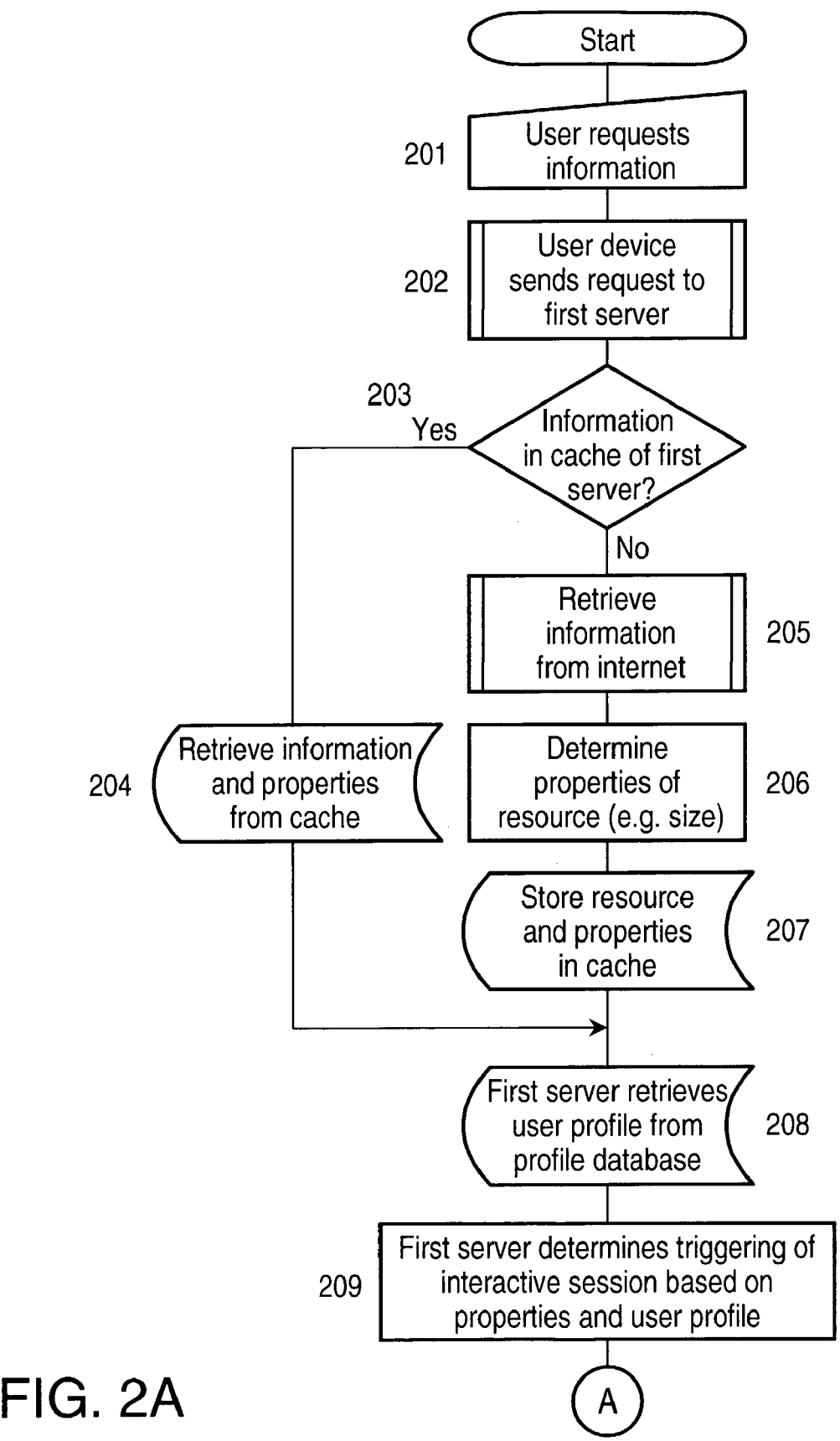
Figure 2B:
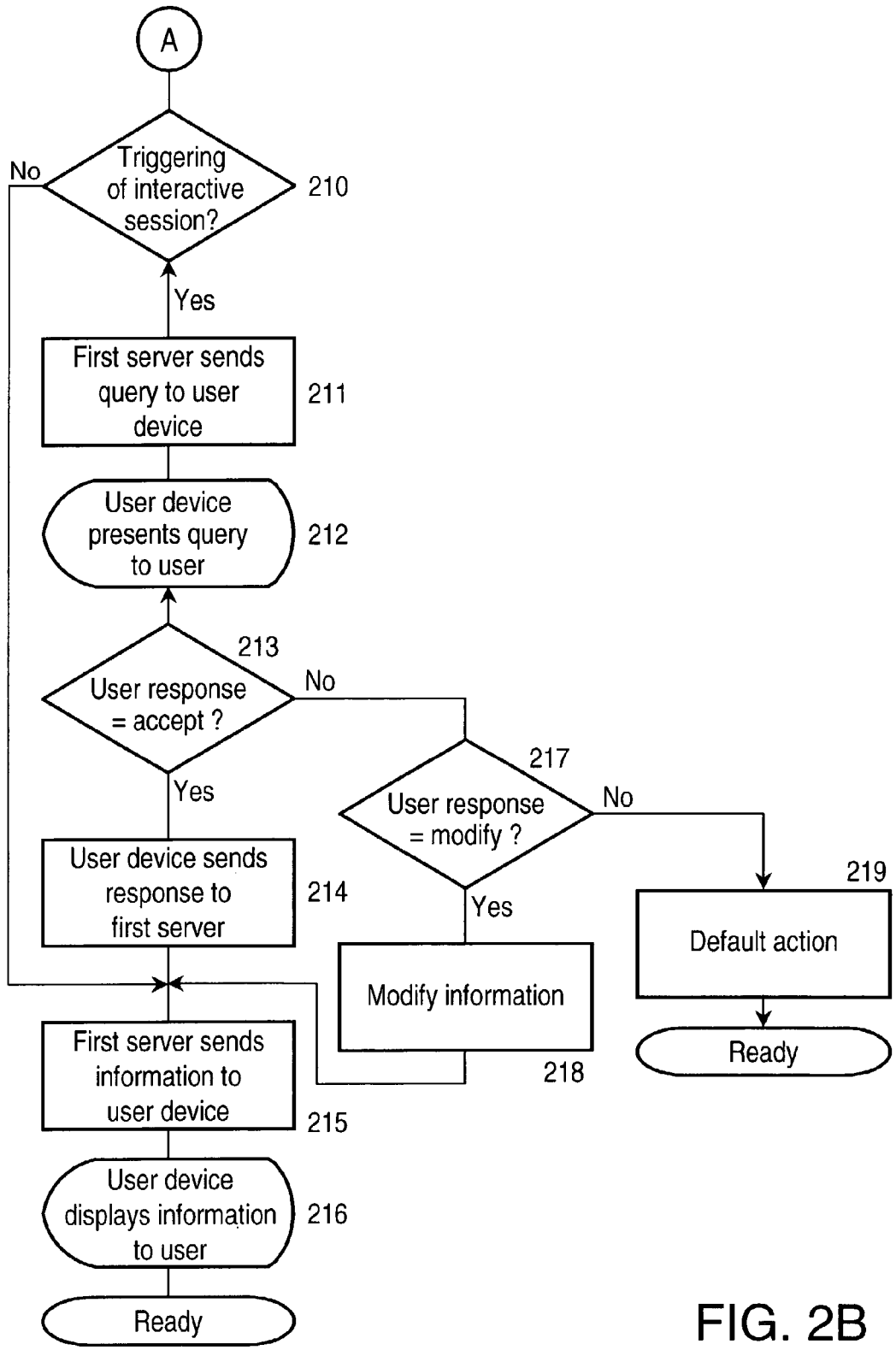
Figure 3:
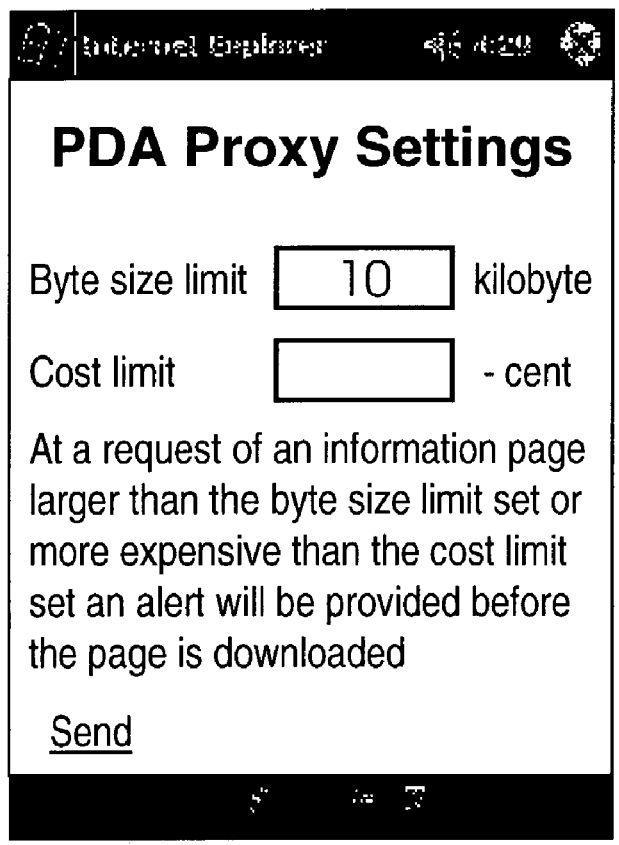
Figures 4A, 4B:
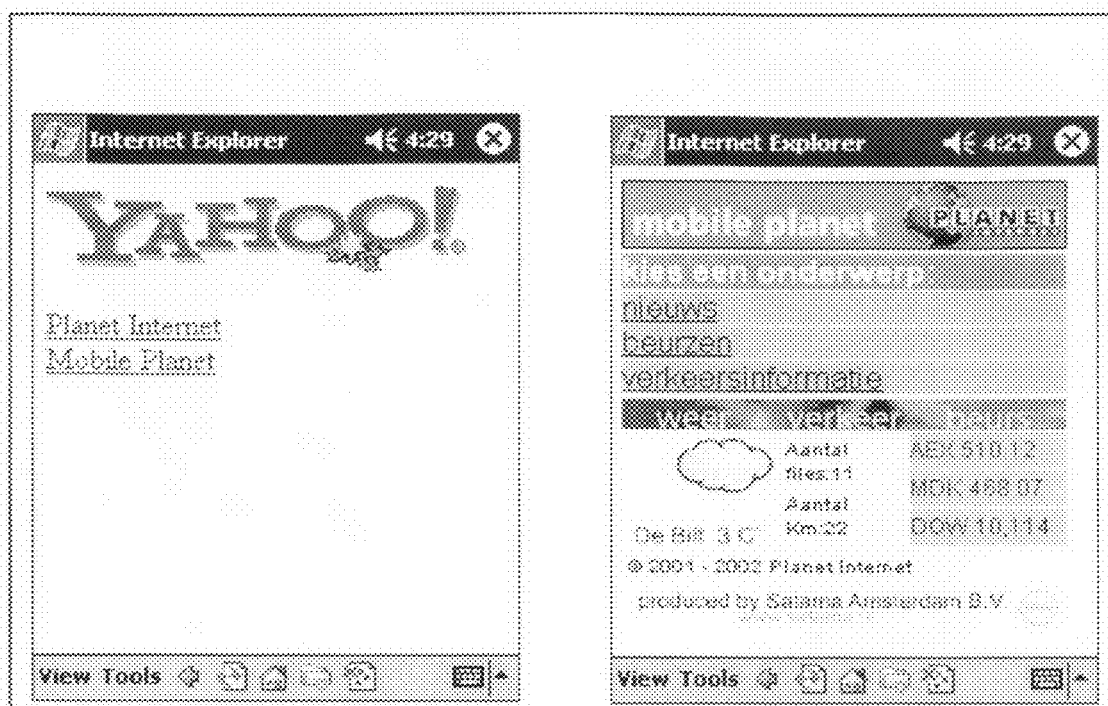
Figure 4C:
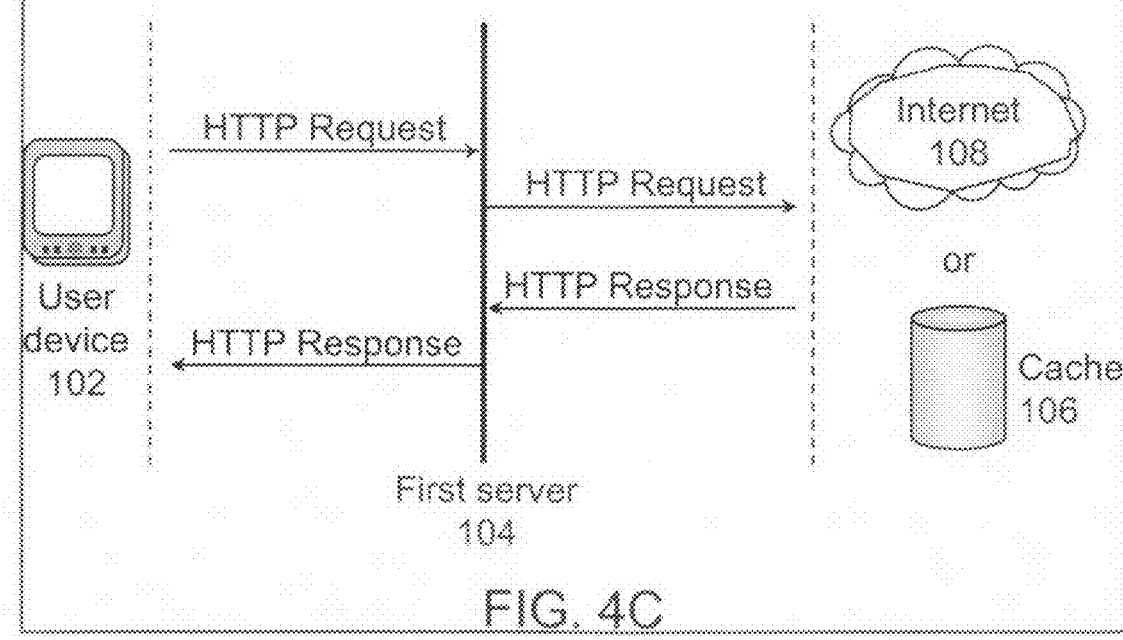
Figures 6A, 6B:
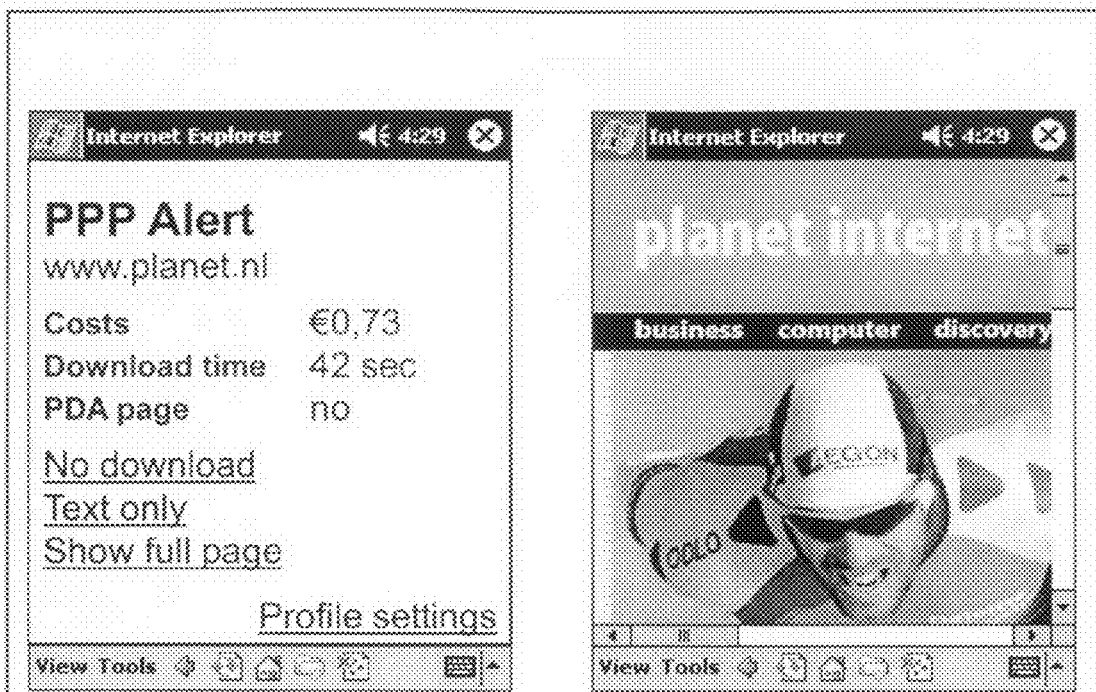
Figure 6C:
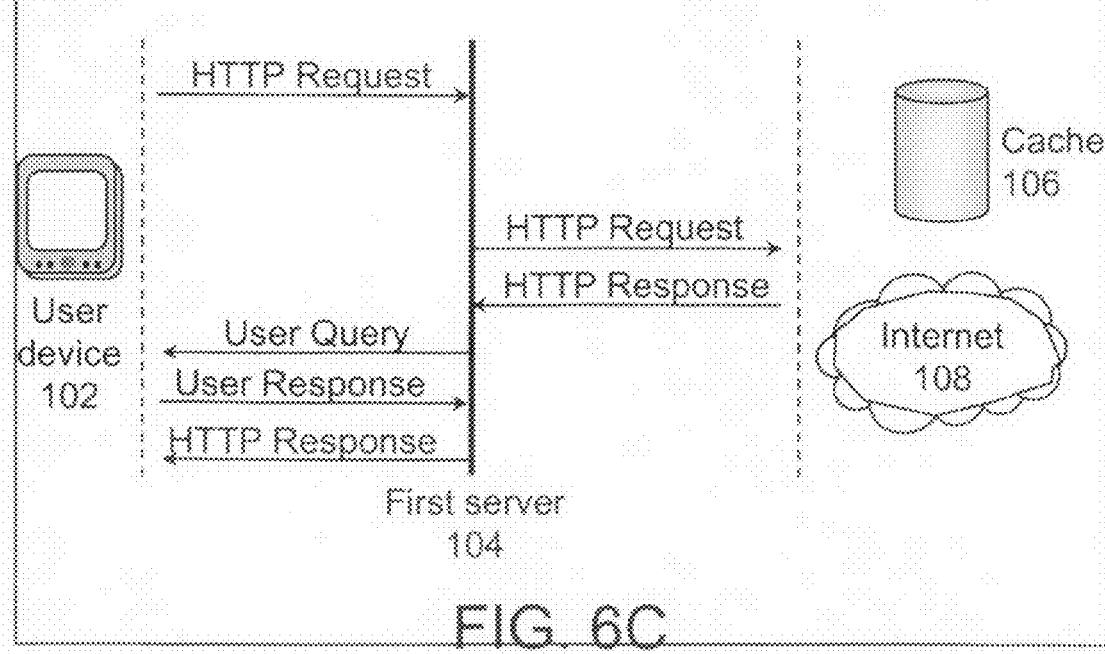
Figures 7A, 7B:
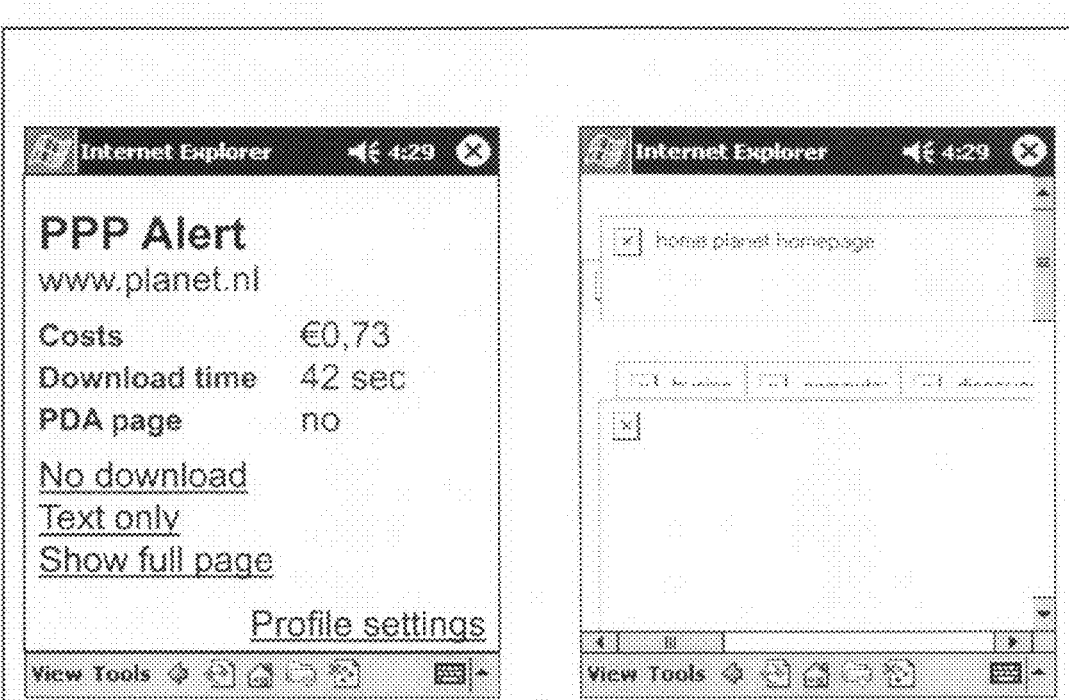
Figure 7C:
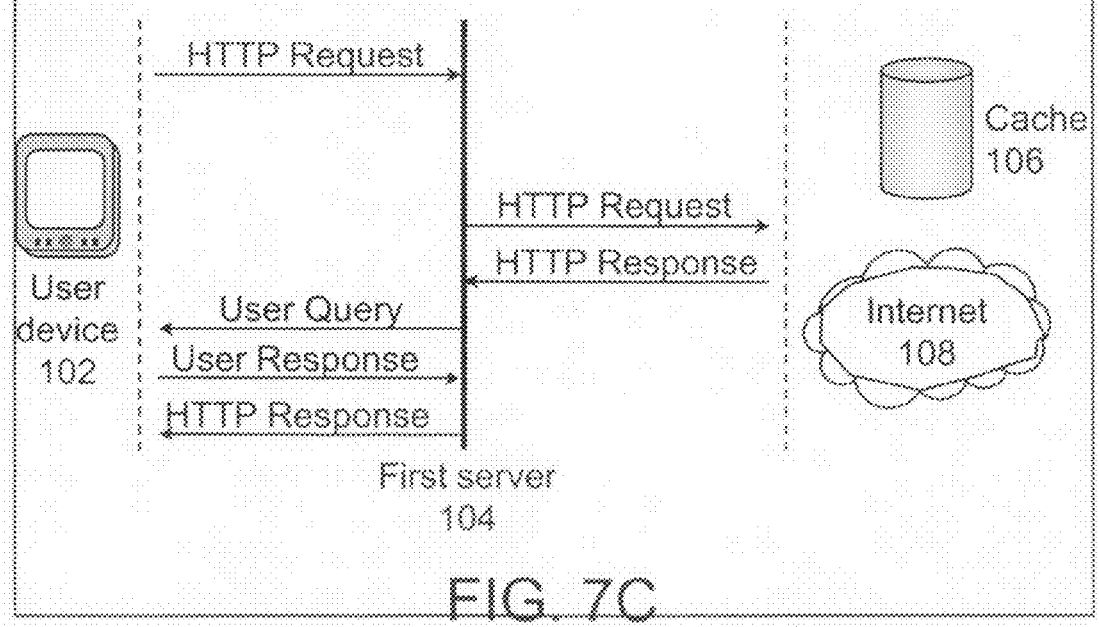

FIG. 1 shows a schematic illustration of a system for transmitting information over a communication network according to an embodiment of the invention;

FIGS. 2A and 2B collectively shows a flow-chart showing various steps of the method according to an embodiment of the invention wherein information can be transmitted over a communication network;

FIG. 3 shows an example of a page wherein the profile settings can be entered and adapted;

FIGS. 4A-C show a first example of executing the method according to an embodiment of the invention;

FIGS. 5A-C show a second example of executing the method according to an embodiment of the invention;

FIGS. 6A-C show a third example of executing the method according to an embodiment of the invention; and FIGS. 7A-C show a fourth example of executing the method according to an embodiment of the invention.

D. DESCRIPTION

For the purpose of teaching the invention, preferred embodiments of the method and system of the invention are described in the sequel. It will be apparent to the person skilled in the art that other alternative and equivalent embodiments of the invention can be conceived and reduced to practice without departing from the true spirit of the invention, the scope of the invention being only limited by the claims as finally granted.

In FIG. 1, a system 100 employing an embodiment of the invention is schematically illustrated. A user 101 requests information with his user device 102 via a wireless communication network 103 from a first server 104. It will be appreciated that the user device 102 can be any device capable of requesting and/or receiving information, such as a personal computer or a personal digital assistant (PDA) via a communication network 103. The communication network can be any type of network capable of carrying or transmitting information or signals. The user device 102 can have a display screen 105 capable of displaying the information received over the communication network 103. It will be appreciated that the user device 102 can be equipped with one or more means (not shown in detail) known to the man skilled in the art for employing the user device 102 to obtain a more or less optimal use of the device. The requested information can be available at the first server 104 in a cache 106. Moreover it can be that the request for information of the user 101 is directed to a second server, but the request is redirected to the first server 104 without the user 101 even noticing it. From at least part of the information available at the first server 104 one or more properties of the information are known. The properties of the information can be stored in the cache 106 as well, e.g., by having or assigning tags to the information containing these properties. Examples of information properties include byte size (data volume) of an information page, display size of the information page in pixels and requirements for a browser format to display the information page. This information can be determined with a content analyzer 107 which, e.g., is also able to distinguish part of information pages and assigns one or more information properties to this part. For the byte size property, the various parts of an information page that are linked to this page via a separate URL can be analyzed and stored as a separate information property. For the display size, the size of the whole information page can be analyzed. For the requirements for the browser, different aspects such as HTML-version, JavaScript support, Java Applets, ActiveX etc. can be considered. This list of properties and derivatives thereof can be extended to other properties. In a variant, the information is stored in the cache 106 without being analyzed with regard to the information properties; only when the information is requested by the user 101 is the information analyzed and eventually stored.

In the embodiment shown in FIG. 1, it can be that the requested information is not available at the first server 104. In that case the server 104 can retrieve the information via the internet 108 from a second server 109, such as a webserver. As already indicated above, the initial request of the user 101 can be directed to the second server 109, but be redirected to the first server 104 for applying the method. The information retrieved from the second server 109 can be analyzed at the first server 104 by means of the content analyzer 107 and be stored at the cache 106 ready to be transmitted. Alternatively the properties of the requested information from the second server 109 are already known at the second server 109 in its cache 106' and can be stored at the first server 104 without being analyzed again.

The first server 104 has access to a profile database 110. In this profile database 110 data of a user 101 and/or a user device 102 can be stored. By comparing the data of a profile for a certain user 101 and/or user device 102 with the properties of the requested information as stored in a database in cache 106 a (set up of) an interactive session between the first server 104 and the user device 102 can be triggered. In this interactive session, a query is provided to the user 101 and/or the user device 102 wherein the information property or a related message or question is 'made known' (e.g., via a short message to the user Device 102) to the user and/or his device providing the option to respond whether and in what form the information can be transmitted to him. Various examples of this feature will be provided below.

To obtain a high degree of flexibility for the user 101, the profile database 110 is accessible to the user 101. In this way, the user 101 can set the profiles related to him and/or his device 102 as well as modify the profiles. Access to this profile database 110 can be obtained by using the user device 102. Alternatively, the user 101 can use another device suited to access the profile database 110. In the embodiment shown, this situation can be achieved by using a home personal computer 111 that has access to the profile database 110 over a wired network 112. By adapting the user profile, the user 101 can be in control of the instances in which the interactive session is triggered.

In FIG. 2, an embodiment of a method of operating the system 100 is shown in a flow chart. In step 201, the user 101 requests information over the communication network 103, which request is directed to the first server 104 in step 202. The server 104 searches in step 203 whether the information is directly available from the cache 106. If this is the case, in step 204 the requested information and the information properties are retrieved from the cache 106. If the requested information is not available in the cache 106, in step 205 the first server 104 retrieves the requested information via the internet 108 from a second server 109. In step 206, the information properties from the information retrieved from the second server 109 are determined by the content analyzer 107 and eventually stored in step 207. In step 208, the first server 204 retrieves a profile belonging to the user 101 and/or the user device 102 from the profile database 110. In step 209, it is determined, based on the information properties obtained from the cache 106 and the data from the profile database 110, whether an interactive session should be triggered. In step 210, the decision to trigger the interactive session is shown. If an interactive session is triggered based on the information properties and the user profile, the first server 104 sends a query to the user device 102 as indicated in step 211. The user device 102 can present the query to the user 101, indicated with 212. Examples of such queries are given below. If the user responds positively in step 213 to the query, the user device 102 sends this positive response to the first server 104 in step 214. In that case, at step 215 the first server 104 sends the information to the user device 102 and the user device 102 displays the requested information to the user 101. If the user response to the query in step 213 is negative, a further query can be send from the first server 104 to the user device 102, indicated at step 217. This query can involve the option to modify the requested information in order to make it suitable for presentation on the user device 102. If this option is chosen, the requested information is modified in step 218 and the modified requested information is send to the user device 102 (step 215) and subsequently presented to the user 101 in step 216. Examples of modification of the requested information will be given below. If this option at 217 is refused, a default action is executed, indicated at 219. Such a default action can be the restoration of the presentation of the page present on the user device 102 before the information was requested.

If the decision at 210 to trigger an interactive session is negative, the first server 104 sends the requested information to the user device 102 over the communication network 103, as is indicated with step 215. The user device 102 displays the requested information to the user 101 in step 216.

Next, an embodiment of a service will be described using the system 100 and method as presented in the FIGS. 1 and 2 respectively. The first server 104 can be a proxy server located between the user 101 and the internet 108. HTTP requests from a user device 102 are directed to this first server 104. The information pages to be retrieved are analysed by the first server 104 by the content analyzer 107 and compared to the profile data from the profile database 110 reflecting the preferences of the user 101 and/or user device 102. If the information page's properties obey the preferences of the user 101 and/or user device 102, the information page is transmitted to the user device 102 without triggering an interactive session. If the information page's properties do not obey the data of the profile database, an interactive session is triggered. In this interactive session, a short message or query is send from the first server 104 to the user device 102 containing, e.g., the estimated download costs and a question whether or not the user 101 wants to continue. If the user 101 wishes to continue, the requested information is transmitted to the user device 102. If the user 101 finds that the download costs are too high, he can abort the request and return to his original page. The user device 102 can, e.g., be a PDA equipped with a Pocket Internet Explorer browser or a laptop PC of an arbitrary type. The user device 102 can access the information via various kinds of communication networks 103, such as GSM or GPRS (utilizing 1,2,3 or 4 slots). If the user 101 is connected to the communication network 103 via a cellular phone, the user 101 might specify the type of mobile phone he uses. This can be relevant for estimating the download time and eventually for a OTA-message with his preferred settings (e.g., the settings, such as a GPRS APN-setting or the proxy to be set, are transmitted via the radio network and automatically be set at the proxy server, e.g. via a special sms message, depending on the type of GPRS user device). Moreover, the type of subscription of a user 101 is preferably made known in order to calculate costs.

After the user 101 has provided (some of the) data of the former paragraph, the user 101 can be given access to the profile database 110. As shown in FIG. 1, this profile database 110 can be accessed via a fixed network 112 with, e.g., a home personal computer 111 as well. The page for setting and adapting the profile can have different presentations, e.g., for mobile internet and for fixed internet devices and these pages can have different functionality. Whether the first server 104 is triggered to set up an interactive session is preferably determined by the preferences of the user 101 as reflected by the profile data of the profile database 110. This profile data can involve, e.g., the byte size of the information pages; pages that, as a whole (i.e., pictures, etc. included), exceed a byte size limit which, in turn, will trigger an interactive session resulting in a prompt to the user 101. A limit can be set in the profile database 110 with regard to the costs as well. Information pages, the download of which exceeds the cost limit, trigger the interactive session between the first server 104 and the user device 102 wherein a query is presented to the user 101 (see step 213 in FIG. 2). An example of a profile setting page for a user device 102 is shown in FIG. 3.

Finally, in the FIGS. 4-7 four sessions will be described where the user 101 requests information with his user device 102 (a PDA) from a first server 104 or a second server 109 where redirection to the first server 104 takes place.

In FIGS. 4A-C the situation is presented where the requested information page present on the first server 104 or a second server 109 is suited to be displayed on the display 105 of the user device 102 and the byte size obeys the limit set in the profile database 110, as shown in FIG. 3. The URL chosen on the PDA 102 as shown in FIG. 4A is, e.g., www-.planet.nl/pda. The proxy server 104 receives the http request and retrieves the information from the cache 106 or a second server 109 via the internet 108. The proxy server 104 analyzes the requested information page, as described previously, and finds that the information page can be transmitted directly to the user 101, since the preferences of the user 101 are met. This situation relates to the no-branch taken in step 210 as shown in FIG. 2 and no interactive session is set up or triggered between the user device 102 and the first server 104. The client-server protocol is shown in FIG. 4C.

In FIGS. 5A-C the situation is presented where the requested information page does not fulfill the user profile as shown in FIG. 3 and downloading of the information to the user device 102 is not performed. In this situation, the user 101, e.g., requests an information page not suited for his device 102 or the byte size of the information page exceeds the byte size limit set in the user profile database 110. Suppose this page chosen from the initial screen as shown in FIG. 5A has a URL www.planet.nl. The first proxy server 104 (here being a proxy server) receives the http request and retrieves the information page (www.planet.nl) from the second server 109, via Internet 108, or the cache 106. If it is determined that the information page is too large with regard to the user profile, an interactive session is triggered. In this session, the proxy server 104 presents a query to the user device 102 alerting that actual downloading of the information page is €0.73. The user 101 is offered a choice on his display 105 between "no download", "text only" and "show full page".

This display is shown in FIG. 5B. If the user 101 chooses "no download", the initial page of FIG. 5A is shown once again. In this situation, it can be that there is no interaction of the user device 102 with the first server 104 or the second server 109 anymore, since the browser might control this situation itself. In FIG. 5C, the client-server protocol of the situation is represented.

In FIGS. 6A-C the situation is presented wherein the requested information page does not fulfill the user profile as shown in FIG. 3 but downloading of the information to the user device 102 is still preferred by the user 101 and/or the user device 102. In this situation, the user 101, e.g., requests an information page not suited for his device 102 or the byte size of the information page exceeds the byte size limit set in the user profile database 110. Suppose this page chosen from the initial screen as shown in FIG. 5A has a URL www.planet.nl. The proxy server 104 receives the http request and retrieves the information page (www.planet.nl) from the second server 109, via Internet 108, or the cache 106. It is determined that the information page is too large with regard to the user profile, an interactive session is triggered. In this session the first proxy server 104, here too being a proxy server, presents a query to the user device 102 alerting that actual downloading of the information page costs €0.73. The user 101 is offered a choice on his display 105 between "no download", "text only" and "show full page". This display 105 is shown in FIG. 6A. If the user 101 chooses "show full page", the first server 104 transmits the information page to the user device 102, and this information page is displayed on the display 105 to the user 101 as shown in FIG. 6B. In this situation, the user takes the risk that the information page cannot be displayed or is displayed incorrectly. In FIG. 6C, the client-server protocol of the situation is represented.

In FIGS. 7A-C, the situation is presented wherein the requested information page does not fulfill the user profile as shown in FIG. 3 but downloading of the information to the user device 102 is still preferred by the user 101 and/or the user device 102 in a modified form. In this situation, the user 101, e.g., requests an information page not suited for his device 102 or the byte size of the information page exceeds the byte size limit set in the user profile database 110. Suppose this page chosen from the initial screen as shown in FIG. 5A has a URL www.planet.nl. The proxy server 104 receives the http request and retrieves the information page (www-.planet.nl) from the second server 109 or the cache 106. If it is determined from the profile database 110 that the information page is too large with regard to the user profile, then an interactive session is triggered. In this session, the first server 104, here a proxy server, presents a query to the user device 102 alerting that actual downloading of the information page costs €0.73. The user 101 is offered a choice on his display 105 between "no download", "text only" and "show full page". This display is shown in FIG. 7A. If the user 101 chooses "text only", the first server 104 transmits the information page to the user device 102 in a modified form and the modified requested information is displayed on the display 105 to the user 101 as shown in FIG. 7B. In this Situation, the first server 104 strips all features other than text from the information page and transmits the modified page to the user device 102. By choosing the option "text only", the user 101 commands his browser to send an http request to the first server 104 which strips the non-text features from the information page, resulting in a modified page that is sent to the user device 102 via an http response. In FIG. 7C, the client-server protocol of the situation is represented.

It is noted that it can be that another option presented to the user 101 in the query is transmission of an information page in a form suitable for the user device 102. If the user, e.g., requests information from www.planet.nl (not suitable for user device 102), the query might offer the possibility for the user 101 and/or user device 102 to retrieve the page from www.planet.nl/pda, which is suitable for the user device 102.

The inventive methodology, as described above and performed By server 104, can be stored, in the form of a software Program containing computer-executable instructions, on a computer-readable media (data carrier) from which the program can be loaded into and then executed by that server.

The invention claimed is:

1. A method for transmitting information, over a communication network having a first server and a mobile user device, the method comprising the steps of:
    receiving a request, from the mobile user device and at the first server, for an item of information then desired by a user;
    retrieving the item of information from its current location;
    accessing a user profile for the user or a user device profile for the user device for both delineation of a pre-defined property of the item of information and a limit value associated with the property, the predefined property and the limit value being defined by specific operational characteristics of the mobile device or preferences of the user;
    analyzing the item of information so as to determine whether an actual value of the property of the item of information exceeds the limit value;
    if the actual value exceeds the limit value, first establishing an interactive session between the first server and the user device during which the first server queries the user, through the user device, by issuing a query to the user device to ascertain, through a user response to the query, whether the user still wants the item of information transmitted to the user device and, if so, whether and how the user wants the information to be modified for transmission to the user device; and
    if as reflected in the user response the user still wants to receive the item of information, then transmitting, in response to results of the query as indicated in the user response, the item of information to the user device and, if the user specified such a modification in the user response, in a modified form as then requested by the user.

2. The method recited in claim 1 wherein the item of information is retrieved from a second server, and the first server then evaluates the pre-defined property of the item of information so retrieved.

3. The method recited in claim 1 wherein the item of information or the actual value of the pre-defined property is stored at the first server.

4. The method recited in claim 1 wherein the item of information or the actual value of the pre-defined property is retrieved from a cache associated with the first server.

5. The method recited in claim 1 wherein the user profile or the user device profile is stored on the first server or retrievable by the first server from a profile database.

6. The method recited in claim 5 wherein the user profile or the user device profile is set by the user via either the user device or any other device connectable to the profile database.

7. The method recited in claim 5 wherein the pre-defined property relates to size of the item of information.

8. The method recited in claim 5 wherein the pre-defined property relates to display measurements of the item of information.

9. The method recited in claim 5 wherein the pre-defined property relates to technical requirements for the user device to properly display the item of information.

10. The method recited in claim 1 wherein the establishing step comprises the steps of:
    sending a first query from the first server to the user device, the first query being presented to the user; and
    receiving, at the first server, a first response from the user device, the first response reflecting a choice made by the user as a result of the first query.

11. The method recited in claim 10 wherein the first query relates to whether the first server should transmit the item of information to the user device.

12. The method recited in claim 11 wherein the transmitting step comprises the step of:
    if the first response specifies that the item of information should be transmitted unmodified, transmitting the item of information unmodified from the first server to the user device.

13. The method recited in claim 12 wherein the transmitting step comprises the steps of:
    if the first response specifies that the item of information should be transmitted but in a particular modified form, transmitting, to the user device, a second query to the user to ascertain how the user desires the item of information to be modified;
    receiving, from the user device and in response to the second query, a second response from the user through which the user has selected a predefined manner through which the item of information is to be modified;
    modifying the item of information in the manner specified by the second response so as to yield a modified item of information; and
    transmitting the modified item of information to the user device.

14. The method recited in claim 13 wherein the second query specifies various alternate manners through which the item of information can be modified.

15. The method recited in claim 14 wherein the alternate manners comprises modifying size of the item of information, display measurements of the item of information or technical requirements for the user device for properly displaying the item of information.

16. The method recited in claim 10 wherein the establishing step further comprises the step of:
    if the first user response reflects that the user does not want the item of information or the second user response reflects that the user has decided not to have the item of information modified, not transmitting the item of information to the user device either in unmodified or modified form.

17. The method recited in claim 10 wherein the first query permits the user to select among various possible responses other than a positive or negative response.

18. The method recited in claim 17 further comprising the step of, where the request for the item of information specifies an information page which is not suitable for the user device, providing the user, through the first query, with an opportunity to request, through the first user response, transmission of an information page which is suitable for the user device.

19. The method recited in claim 1 wherein the item of information comprises information parts and the pre-defined property relates to one or more of the information parts.

20. The method recited in claim 1 wherein the establishing step comprises the step of comparing size of the item of information with a threshold size contained in either the user profile or the user device profile.

21. The method recited in claim 1 wherein the establishing step comprises the step of comparing display measurements of the item of information with details of a display size of the user device specified in either the user profile or the user device profile.

22. The method recited in claim 1 wherein the establishing step comprises the step of comparing format of the item of information with details contained in either the user profile or the user device profile relating to compatibility of the user device to operate with said format.

23. The method recited in claim 1 wherein the user profile or the user device profile comprises details of one or more selected from a group comprising: threshold size for the item of information, display size of the user device, and technical compatibility of the user device with one or more information formats.

24. The method recited in claim 20 wherein the details of the compatibility of the user device relates to HTML types, ActiveX, Java applets, or Flash.

25. A system for transmitting information, over a communication network having a first server and a mobile user device, the system comprising:
   the mobile user device;
   the network connecting the mobile user device and the first server; and
   the first server having:
      a receiver for receiving a request, from the mobile user device and at the first server, for an item of information then desired by a user;
      means for retrieving the item of information from its current location;
      means for accessing a user profile for the user or a user device profile for the user device for both delineation of a pre-defined property of the item of information and a limit value associated with the property, the predefined property and the limit value being defined by specific operational characteristics of the mobile device or preferences of the user;
      a comparator for analyzing the item of information so as to determine whether an actual value of the property of the item of information exceeds the limit value;
      an interactive session manager for first establishing, if the actual value exceeds the limit value, an interactive session between the first server and the user device during which the first server queries the user, through the user device, by issuing a query to the user device to ascertain, through a user response to the query, whether the user still wants the item of information transmitted to the user device and, if so, whether and how the user wants the information to be modified for transmission to the user device; and
      means for transmitting, if as reflected in the user response the user still wants to receive the item of information and in response to results of the user query, the item of information to the user device and, if the user specified such a modification in the user response, in a modified form as then requested by the user.

26. The system recited in claim 25 further comprising a second server connected to the network and through which the item of information can be retrieved, and wherein the first server evaluates the pre-defined property of the item of information.

27. The system recited in claim 26 wherein the first server comprises a cache from which the actual value of the pre-defined property of the item of information can be retrieved.

28. The system recited in claim 25 wherein the first server comprises a cache from which the item of information or the actual value of the pre-defined property of the item of information can be retrieved.

29. The system recited in claim 25 wherein the item of information contains information parts and the pre-defined property relates to one or more of the information parts.

30. The system recited in claim 29 wherein the information parts comprise text, images, movies, sounds or applets, and the pre-defined property comprises size, download costs, display size, or technical requirements for the user device to properly display either an item of information or one of the information parts.

31. The system recited in claim 25 further comprising a profile database from which the user profile or the user device profile can be accessed.

32. The system recited in claim 31 further comprising means for setting the user profile or the user device profile via the user device or any other device connectable to the first server.

33. The system recited in claim 31 wherein the pre-defined property relates to size of the item of information.

34. The system recited in claim 31 wherein the pre-defined property relates to display measurements of the item of information.

35. The system recited in claim 25 wherein the interactive session manager comprises:
   means for sending a first query to the user device; and
   means for receiving a first response from the user device.

36. The system recited in claim 35 wherein the first server comprises:
   means for modifying the item of information, if the first response specifies that the item of information should be transmitted but in a particular modified form, so as to define a modified item of information; and
   means for transmitting the modified item of information to the user device.

37. The system recited in claim 25 wherein the comparator is compares size of the item of information with a threshold size contained in the user profile or the user device profile.

38. The system recited in claim 25 wherein the comparator compares display measurements of the item of information with details of a display size of the user device contained in the user profile or the user device profile.

39. The system recited in claim 25 wherein the comparator compares format of the item of information with details contained in the user profile or the user device profile relating to compatibility of the user device to operate with the format.

40. A computer readable medium containing computer executable instructions which, when executed on a first computer server, cause the first server to transmit information, over a communication network, to a mobile user device by performing the steps of:
   receiving a request, from the mobile user device and at the first server, for an item of information then desired by a user;
   retrieving the item of information from its current location;
   accessing a user profile for the user or a user device profile for the user device for both delineation of a pre-defined property of the item of information and a limit value associated with the property, the predefined property and the limit value being defined by specific operational characteristics of the mobile device or preferences of the user;
   analyzing the item of information so as to determine whether an actual value of the property of the item of information exceeds the limit value;

if the actual value exceeds the limit value, first establishing an interactive session between the first server and the user device during which the first server queries the user, through the user device, by issuing a query to the user device to ascertain, through a user response to the query, whether the user still wants the item of information transmitted to the user device and, if so, whether and how the user wants the information to be modified for transmission to the user device; and if as reflected in the user response the user still wants to receive the item of information, then transmitting, in response to results of the query as indicated in the user response, the item of information to the user device and, if the user specified such a modification in the user response, in a modified form as then requested by the user.

41. The computer readable medium recited in claim 40 comprising further computer executable instructions, which when executed by the first server, cause the first server to perform the steps of retrieving the item of information from a second computer server connected to the network, and then evaluating the pre-defined property of the item of information so retrieved.

42. A communication network for carrying information, the network having a mobile user device and a first server, the communication network implementing computer executable instructions which, when executed by the first server:

cause the network to perform the step of:
carrying a request, from the mobile user device to the first server, for an item of information then desired by a user; and cause the first server to perform the steps of:
receiving the request from the first server;
retrieving the item of information from its current location;
accessing a user profile for the user or a user device profile for the user device for both delineation of a pre-defined property of the item of information and a limit value associated with the property, the pre-defined property and the limit value being defined by specific operational characteristics of the mobile device or preferences of the user;
analyzing the item of information so as to determine whether an actual value of the property of the item of information exceeds the limit value;
if the actual value exceeds the limit value, first establishing an interactive session between the first server and the user device during which the first server queries the user, through the user device, by issuing a query to the user device to ascertain, through a user response to the query, whether the user still wants the item of information transmitted to the user device and, if so, whether and how the user wants the information to be modified for transmission to the user device; and
if as reflected in the user response the user still wants to receive the item of information, then transmitting, in response to results of the query as indicated in the user response, the item of information to the user device and, if the user specified such a modification in the user response, in a modified form as then requested by the user; and cause the network to perform the further step of:
carrying the item of information from the first server to the user device.

* * * * *